(12) United States Patent
Abousleman

(10) Patent No.: US 6,539,122 B1
(45) Date of Patent: Mar. 25, 2003

(54) ADAPTIVE WAVELET CODING OF HYPERSPECTRAL IMAGERY

(75) Inventor: Glen Patrick Abousleman, Scottsdale, AZ (US)

(73) Assignee: General Dynamics Decision Systems, Inc., Scottsdale, AZ (US)

(*) Notice: Subject to any disclaimer, the term of this patent is extended or adjusted under 35 U.S.C. 154(b) by 0 days.

(21) Appl. No.: 09/050,293

(22) Filed: Mar. 30, 1998

Related U.S. Application Data

(60) Provisional application No. 60/043,409, filed on Apr. 4, 1997.

(51) Int. Cl.[7] .................................................. G06K 9/36
(52) U.S. Cl. .................. 382/240; 348/155; 370/207; 370/210; 375/240.22; 375/240.23; 375/240.24; 375/241; 375/265; 382/236; 382/238; 382/248; 382/250; 382/253
(58) Field of Search ................. 375/240.23–240.25, 375/241, 242, 262, 265; 348/21, 155, 192–193, 470, 607; 358/426, 429, 455; 370/207, 529, 535; 382/232, 235, 253, 248, 250, 251

(56) References Cited

U.S. PATENT DOCUMENTS

| | | | | |
|---|---|---|---|---|
| 5,297,170 A | * | 3/1994 | Eyuboglu et al. | 375/242 |
| 5,321,725 A | * | 6/1994 | Paik et al. | 375/265 |
| 5,543,939 A | * | 8/1996 | Harvey et al. | 358/426 |
| 5,576,767 A | * | 11/1996 | Lee et al. | 375/240.14 |
| 5,748,226 A | * | 5/1998 | Limberg | 348/21 |
| 5,764,805 A | * | 6/1998 | Martucci et al. | 382/238 |
| 5,901,135 A | * | 5/1999 | Chung et al. | 370/207 |
| 5,974,181 A | * | 10/1999 | Prieto | 382/232 |
| 6,043,844 A | * | 3/2000 | Bist et al. | 375/240.24 |
| 6,141,384 A | * | 10/2000 | Wittig et al. | 375/240.25 |
| 6,177,951 B1 | * | 1/2001 | Ghosh | 348/21 |

OTHER PUBLICATIONS

Sriram, P. Marcelin, M.W., "Imaging Coding Using Wavelet Transformation an Entropy–Constrained Trellis Coded Quantization," IEEE Transactions on Image Processing, vol. 4, No. 6 Jun. 1995, pp. 725–733.*

Ito et al, "A Wavelet Video Coder Using Entropy–Constrained Trellis Coded Quantization", IEEE, pp. 598–601, Sep. 1994.*

* cited by examiner

Primary Examiner—Jayanti K. Patel
Assistant Examiner—Gregory Desiré
(74) Attorney, Agent, or Firm—Jenner & Block, LLC

(57) ABSTRACT

A hyperspectral image encoder (10) for compressing hyperspectral imagery includes a differential pulse code modulation (DPCM) loop (26) to perform data decorrelation in the spectral domain and a discrete wavelet transform (DWT) processing means (28) to perform decorrelation in the spatial domain. The DPCM loop (26) determines an error image between a present image at the input of the encoder (10) and a predicted image. The DWT processing means (28) then divides the error image into a plurality of frequency subbands and quantizes information within the subbands in accordance with a plurality of predetermined quantization states to provide a coded output signal. In one embodiment, an interband predictor (24) is provided to predict an image, for use in calculating the error image, using the coded output signal.

2 Claims, 5 Drawing Sheets

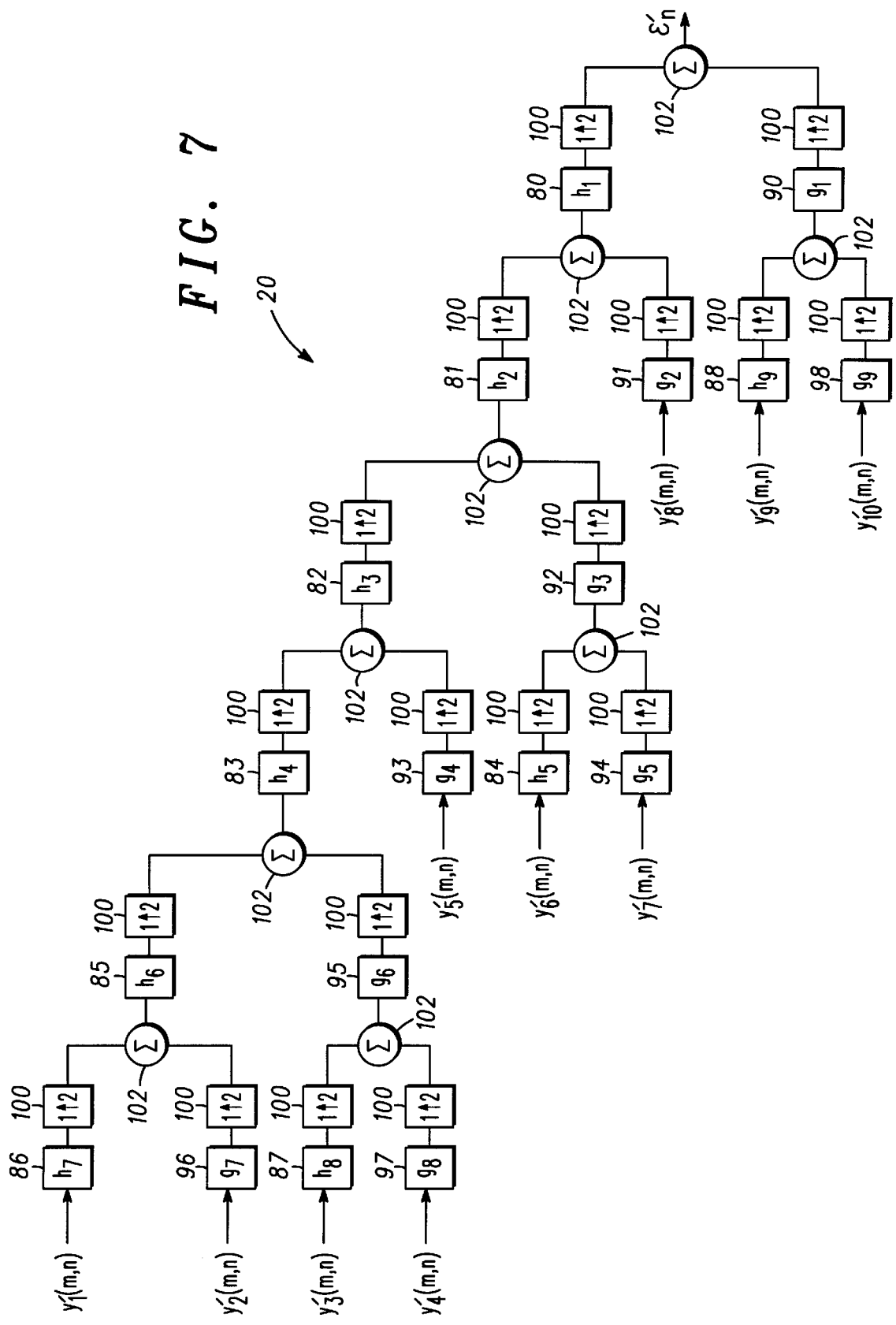

ADAPTIVE WAVELET CODING OF HYPERSPECTRAL IMAGERY

This application claims the benefit of U.S. Provisional Application No. 60/043,409, filed Apr. 4, 1997, which is hereby incorporated by reference in the present application.

FIELD OF THE INVENTION

The present invention relates in general to data compression techniques and, more particularly, to data compression of hyperspectral imagery.

BACKGROUND OF THE INVENTION

Hyperspectral imaging is a process whereby images are recorded by sensing and storing energy in a number of narrow wavelength slices. For example, in a remote sensing application, information can be recorded in many different spectral bands to describe a scene of interest. Hyperspectral images generally include a vast amount of information about a scene of interest and therefore are very valuable analysis tools for scientists and researchers.

Many applications making use of hyperspectral imaging are satellite-based. The next generation of satellite based imaging systems will be capable of sensing scene radiation in hundreds of distinct wavelength regions. The High-Resolution Imaging Spectrometer (HIRIS) is an example of a future high-resolution multi-band spectrometer. HIRIS can collect 192 spectral bands in the 0.4–2.5 micrometer wavelength region, with each band on the order of 1,000×1,000 pixels. Combining these parameters with a radiometric sensitivity of 12 bits produces a single hyperspectral image which comprises several hundred megabytes of digital information. As can be appreciated, storage and/or transmission of multiple images having this size requires a vast amount of system resources (e.g., memory space, transmission time, etc.).

Therefore, a need exists for a method and apparatus for compressing hyperspectral imagery data.

BRIEF DESCRIPTION OF THE DRAWINGS

FIG. 7 is a block diagram illustrating a DWT reconstruction unit in accordance with one embodiment of the present invention.

DETAILED DESCRIPTION OF THE DRAWINGS

The present invention relates to a system for compressing hyperspectral imagery. The system uses differential pulse code modulation (DPCM) for performing spectral decorrelation and an adaptive two dimensional discrete wavelet coding scheme for spatial decorrelation. A DPCM loop is operative for determining an error image between a current input image and a predicted current image. The error image is then decomposed into a plurality of discrete frequency subbands. Blocks within each of the frequency subbands are then each, classified into one of a plurality of classes in a manner which maximizes coding gain. The resulting sequences are quantized using, for example, entropy-constrained trellis coded quantization (ECTCQ). In a preferred embodiment, code books are optimized for different generalized Gaussian distributions. Rate allocation is performed in an optimal fashion by an iterative technique which uses the rate-distortion performance of the various trellis-based quantizers.

Figure 1:
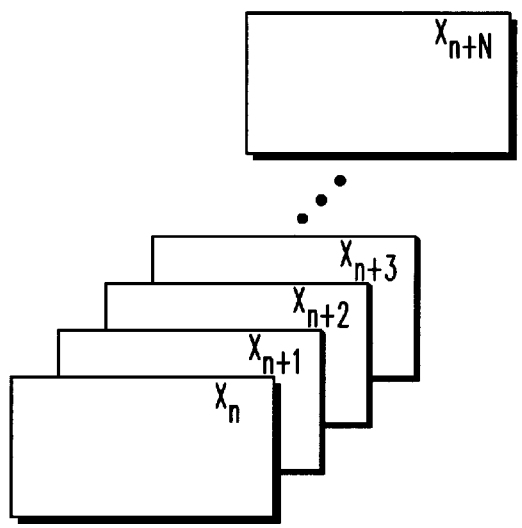
FIG. 1 is a diagram illustrating a basic data structure for hyper spectral imagery.

FIG. 1 is a schematic diagram illustrating the structure of typical hyperspectral imagery. As shown, the hyperspectral imagery includes a plurality of two-dimensional images $x_n$–$x_{n+N}$ that are each associated with a different spectral band. Each of these two-dimensional images represents sensed radiation within a spectral bandwidth as narrow as 10 nanometers. As discussed previously, hyperspectral imagery generally requires a vast amount of uncompressed data to be fully described. In this regard, it is very important that a method and apparatus be developed for compressing this data as much as possible to facilitate storage and/or transmission of the hyperspectral imagery. The present invention provides a method and apparatus for effectively compressing the hyperspectral imagery in a relatively simple and efficient manner. In one embodiment, the invention utilizes DPCM to perform spectral decorrelation between successive images (e.g., $x_n$ and $x_{n+1}$) while performing two dimensional discrete wavelet transformation (DWT) to perform spatial decorrelation of an error image between the current image and its prediction. The invention is capable of achieving compression ratios of greater than 70:1 with an average peak signal-to-noise ratio (PSNR) of a coded hyperspectral sequence exceeding 41 dB.

Figure 2:
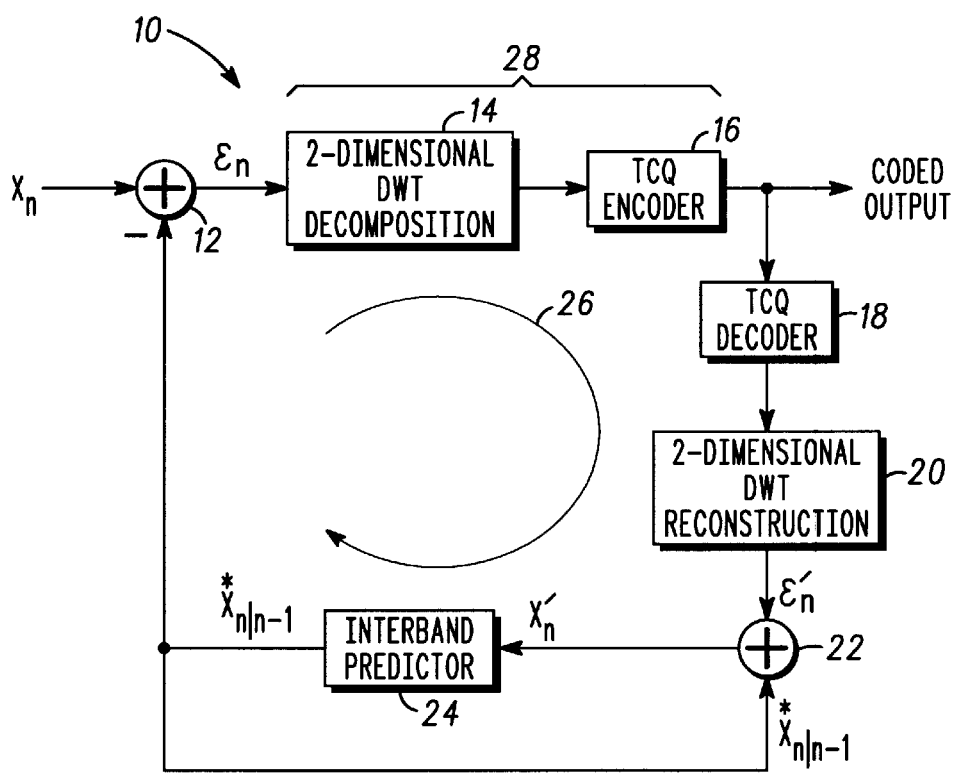
FIG. 2 is a block diagram illustrating a hyperspectral image encoder in accordance with one embodiment of the present invention.

FIG. 2 is a block diagram illustrating a hyperspectral image encoder 10 in accordance with one embodiment of the present invention. The hyperspectral image encoder 10 includes: a subtractor 12, a two-dimensional DWT decomposition unit 14, a trellis coded quantization (TCQ) encoder 16, a TCQ decoder 18, a two-dimensional DWT reconstruction unit 20, an adder 22, and an interband predictor 24. Subtractor 12 is operative for finding a difference between a present input image $x_n$ and its predicted value $x^*_{n|n-1}$ (where the asterisk indicates a predicted value and n|n−1 indicates $x_n$ given $x_{n-1}$. The subtractor 12 outputs an error image $\epsilon_n$ which is received by the two dimensional DWT decomposition unit 14.

The DWT decomposition unit 14 divides the error image $\epsilon_n$ into a plurality of discrete frequency subbands using, in a preferred embodiment, a series of low-pass and high-pass filters. Preferably, each of the frequency subbands defined by the DWT decomposition unit 14 are mutually uncorrelated. However, some correlation between frequency subbands can be tolerated. After the error image $\epsilon_n$ is divided into frequency subbands, one or more blocks within each subband are classified into one of J classes in a manner that maximizes the coding gain. The resulting sequences are quantized using entropy-constrained trellis coded quantization in the TCQ encoder 16. The output of TCQ encoder 16 represents the coded (i.e., compressed) hyperspectral imagery.

As discussed previously, to determine the error image $\epsilon_n$, a predicted present image is subtracted from the present input image. To predict the next image, it is first necessary to "reconstruct" an approximation of the present image $x_n'$ from the coded output signal. The TCQ decoder 18 receives the coded output signal from the TCQ encoder 16 and performs an inverse quantization function on the signal. The resulting signal is then input into the two dimensional DWT reconstruction unit 20 where the discrete frequency subbands are reassembled into an error image estimate $\epsilon'_n$. Because the original error image $\epsilon_n$ had been quantized in the TCQ encoder 16, with an associated loss of information, the error image estimate $\epsilon'_n$ may not be an exact replica of the error image $\epsilon_n$ originally input into the two dimensional DWT decomposition unit 14. The adder 22 adds the error image estimate $\epsilon'_n$ to the predicted image $x^*_{n|n-1}$ to produce image estimate $x'_n$. The interband predictor 24 operates on the image estimate $x'_n$ to determine the predicted next image $x^*_{n|n-1}$ for the next iteration.

The hyperspectral image encoder 10 of FIG. 2 incorporates a DPCM loop 26 for performing decorrelation in the spectral domain with a discrete wavelet transform (DWT) processing means 28 for performing decorrelation in the spatial domain. This unique combination of decorrelation methods has been found to provide enhanced compression of hyperspectral imagery. Because the DWT processing means 28 operates on error images, rather than on entire images, significant data compression is realized. That is, the error image $\epsilon_n$ will, on average, be significantly smaller in magnitude than the input image $x_n$. Accordingly, fewer quantization bits, and thus, fewer bits are required to encode the error sequence than would be required to encode the original sequence of images.

Figure 3:
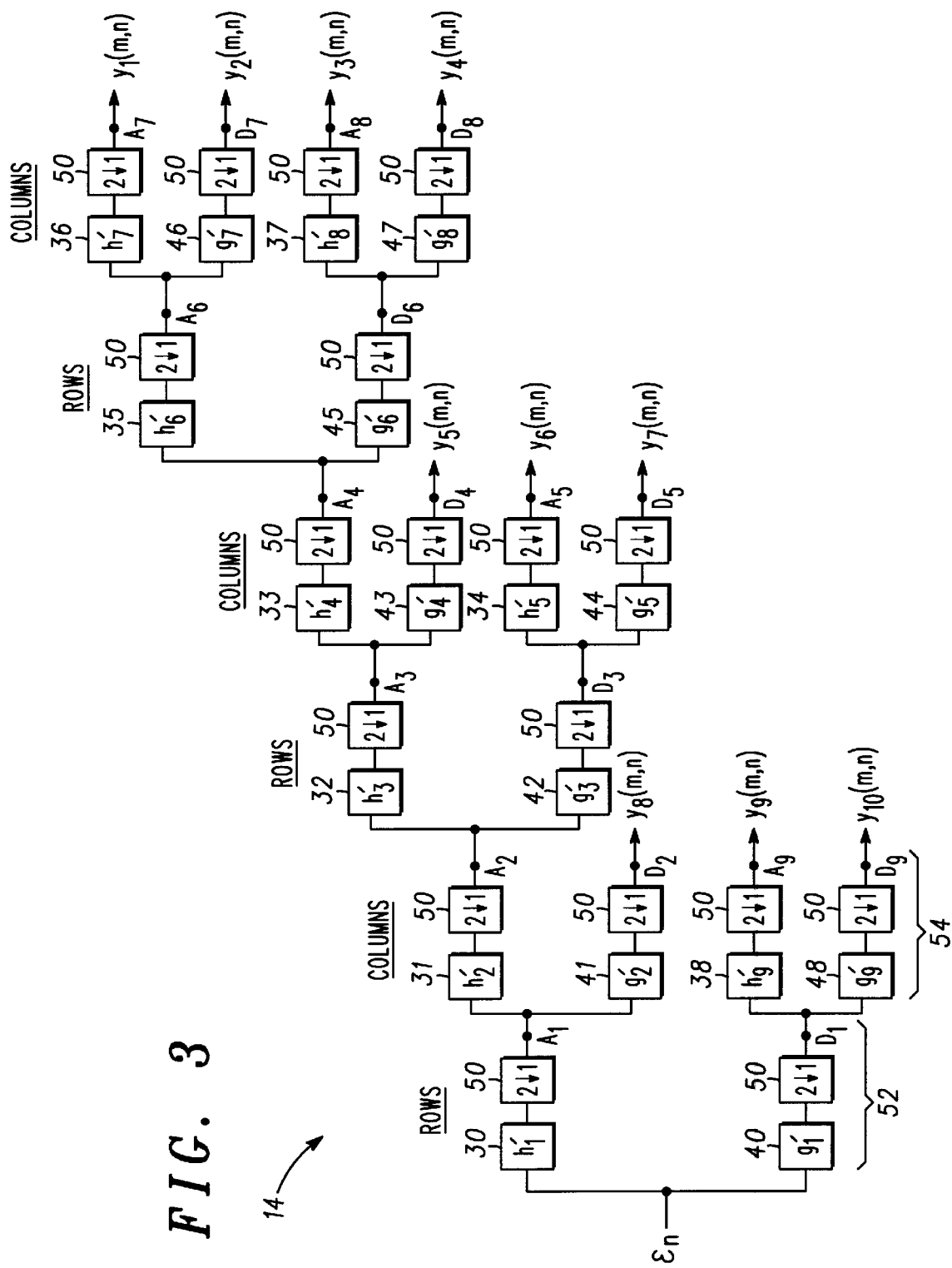
FIG. 3 is a block diagram illustrating a discrete wavelet transform (DWT) decomposition unit in accordance with one embodiment of the present invention.

FIG. 3 is a block diagram illustrating the two-dimensional DWT decomposition unit 14 in one embodiment of the present invention. The DWT decomposition unit 14 includes a plurality of low pass filters 30–38 and a plurality of high pass filters 40–48 for performing spectral decomposition of the error image $\epsilon_n$. In a preferred embodiment, the low and high pass filters are implemented as finite impulse response (FIR) filters. As described above, the error image $\epsilon_n$ is decomposed into a number of frequency subbands for eventual classification and quantization in the TCQ encoder 16. The DWT decomposition unit 14 also includes a plurality of down samplers 50 for reducing the overall number of samples describing the contents of each frequency subband. In the preferred embodiment, as illustrated in FIG. 3, 2-to-1 down samplers 50 are used to remove and discard every other bit from the sequence output by each high-pass and low-pass filter. In general, the down sampling ratio used will be application specific. The two-dimensional DWT decomposition unit 14 outputs one two-dimensional signal for each of the discrete frequency subbands (i.e., $y_1(m,n)$–$y_{10}(m,n)$). In the preferred embodiment, a 10-band octave decomposition is used.

As shown in FIG. 3, each stage of the DWT decomposition unit 14 divides an input signal into a course approximation signal $A_m$ and a detail signal $D_m$. The course approximation signal $A_m$ and the detail signal $D_m$ may then be further divided into further approximation and detail signals (e.g., $A_{m+1}$ and $D_{m+1}$) This filtering scheme facilitates the performance of row/column splitting. A row/column split effectively filters a two dimensional input signal of dimension M rows by N columns along the rows and columns to produce four subbands, each of dimension M/2 rows by N/2 columns. With reference to FIG. 3, this operation is performed as follows. In the first stage 52 of the DWT decomposition unit 14, each row of length N, $x[n]$, of the 2 dimensional input signal $\epsilon_n$ is convolved with the impulse response $h_1'$ of the first low pass filter 30 to produce a filtered output sequence y[n] which is also of length N. The output sequence y[n] is then decimated by a factor of two in the corresponding 2-to-1 down sampler 50 to produce a sequence y'[n] of length N/2. Also in the first stage 52 of the DWT decomposition unit 14, the sequence x[n] is convolved with the impulse response $g_1'$ of the first high pass filter 40 to produce a filtered output sequence z[n] of length N. The output sequence z[n] is decimated in the corresponding 2-to-1 down sampler 50 to produce sequence z'[n] of length N/2. The output sequences y'[n] for the rows of $\epsilon_n$ are then collected into a new 2-dimensional signal $A_1$ of dimension M rows by N/2 columns. Similarly, the output sequences z'[n] for the rows of $\epsilon_n$ are collected into a new 2-dimensional signal $D_1$ of dimension M rows by N/2 columns.

In the second stage 54 of the DWT decomposition unit 14, each column u[n] of signal $A_1$ is convolved with the impulse response $h_2'$ of low pass filter 31 to produce a filtered output sequence v[n] of length M. The sequence is decimated in the corresponding 2-to-1 down sampler 50 to create sequence v'[n] of length M/2. In the second stage 54, each column u[n] is convolved with the impulse response $g_2'$ of high pass filter 41 to create a filtered output sequence w[n] of length M. The sequence w[n] is then decimated to produce a sequence w'[n] of length M/2. The sequences v'[n] for all of the columns of sequence $A_1$ are then collected into a new 2-dimensional signal $A_2$ of dimension M/2 rows by N/2 columns. Similarly, the sequences w'[n] for all of the columns of sequence $A_1$ are collected into a new 2-dimensional signal $D_2$ of dimension M/2 rows by N/2 columns. A similar procedure is then performed to signal $D_1$ to complete the row/column split. As indicated in FIG. 3, further row/column splits can then be performed to further divide the input signal.

The discrete wavelet transform (DWT) embodies the notion of successive approximation together with that of added detail. Two functions are generally utilized to perform a DWT. The first function is known as the mother wavelet $\Psi$ while the second function is known as the scaling function $\Phi$. The scaling function $\Phi$ can be chosen such that translated and scaled versions form a basis for a vector space $V_m$. Successive approximation spaces are created by letting m vary:

$$V_2 \subset V_1 \subset V_0 \subset V_{-1} \subset V_{-2}$$

Translations of the mother wavelet $\psi$ result in a vector space $W_m$ which is the complement of vector space $V_m$ in $V_{m-1}$. Note that $V_m$ has a resolution of $2^{-m}$. It should be appreciated that the course approximation signal $A_m$ is simply the projection of the input signal onto the vector space $V_{m+1}$ and the detail signal $D_m$ is the projection of the input signal onto the vector space $W_{m+1}$. It should also be noted that the low-pass impulse responses $h_n'$ are derived from the scaling function $\Phi$ and the high pass impulse responses $g_n'$ are derived from the mother wavelet $\Psi$.

It is desirable to construct wavelet bases which are orthonormal. Orthonormal wavelet bases yield orthogonal (and hence uncorrelated) sub-images which enable more efficient quantization. It is desirable to also have analysis and synthesis filters that have a linear phase which enables the use of non-expansive symmetric extension methods at the signal boundaries. Further, the analysis and synthesis filters should have finite length (i.e., compact support) which yields perfect reconstruction in the absence of quantization error. It has been shown that non-trivial filters having all the above characteristics do not exist. However, in accordance with the present invention, suitable filters are provided by dropping the necessity for perfect reconstruction and/or by relaxing the ortho-normality requirement. For example, in one embodiment of the present invention, biorthogonal wavelet bases are used, such as the ones described in "Biorthogonal Bases of Compactly Supported Wavelets" by Cohen et al., Commun. Pure Appl. Math, vol. 41, June 1992, and "Wavelets and Filter Banks: Relationships and New Results" by Vetterli et al., Conference Proceedings, 1990 Int. Conf. on Acoust., Speech, and Signal Proc., April 1990, which are both hereby incorporated by reference. The associated decomposition and reconstruction filters can be represented as follows:

$$H(\omega)H'(\omega) = \cos(\omega/2)^{2l}\left[\sum (l-1+p)\sin(\omega/2)^{2p} + \sin(\omega/2)^{2l}R(\omega)\right],$$

$$g(n) = (-1)^n h'(-n+1)$$

$$g'(n) = (-1)^n h(-n+1)$$

where $H(\omega)$ and $H'(\omega)$ are the Fourier transforms of the impulse responses h and h', respectively, $R(\omega)$ is an odd polynomial in $\cos(\omega)$, $2l=k+k'$, and $\Psi$ and $\Psi'$ are (k−1) and (k'−1) continuously differentiable, respectively. In a preferred embodiment of the present invention, $H(\omega)$ and $H'(\omega)$ are determined using the spline variant family of filters with k=k'=4. A description of such an approach can be found in "Image Coding Using Wavelet Transforms and Entropy Constrained Trellis Coded Quantization", by Sriram et al., IEEE Trans. Image Proc., vol. 4, June 1995, which is hereby incorporated by reference. The resulting filters having impulse responses h' and h are 9-tap and 7-tap filters, respectively.

Figure 4:
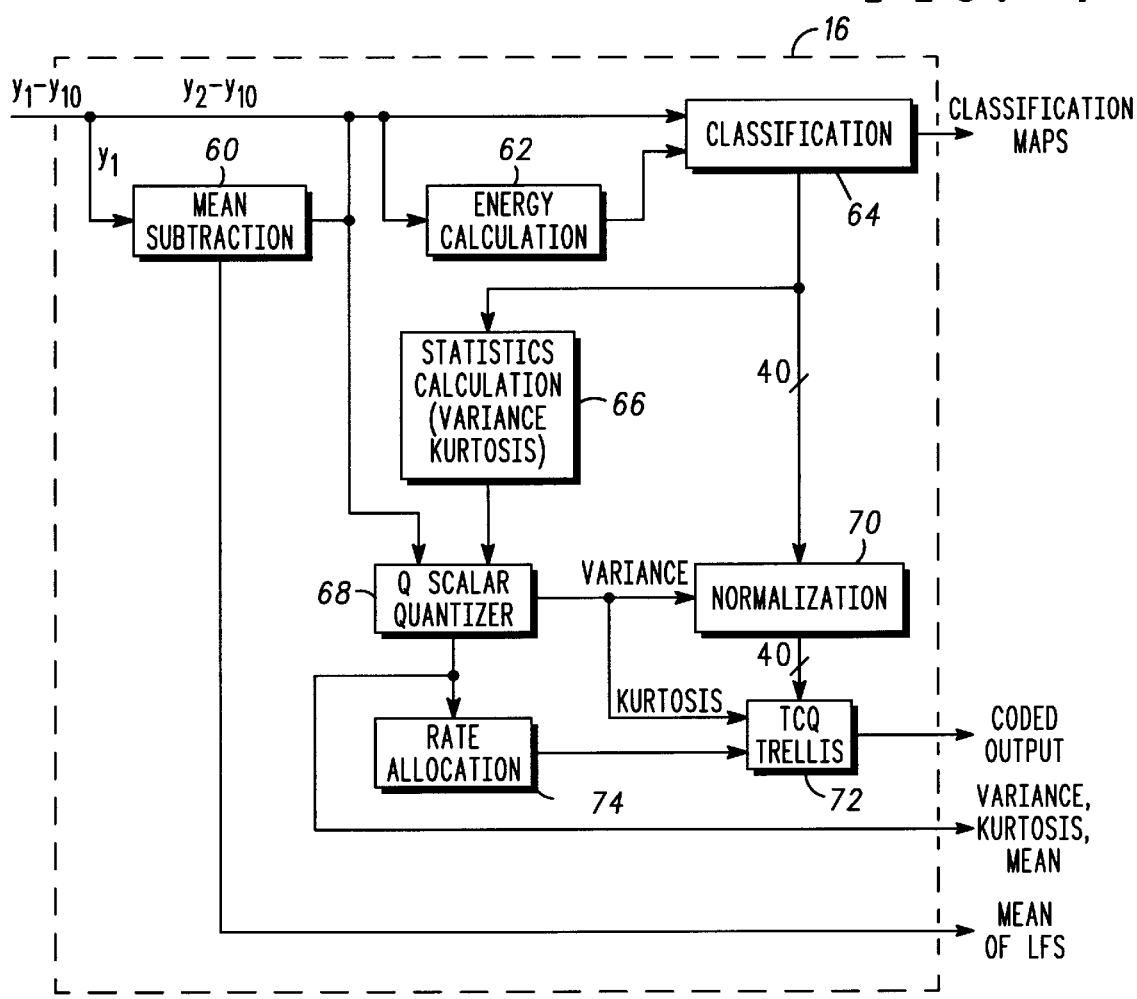
FIG. 4 is a block diagram illustrating a trellis coded quantization (TCQ) encoder in accordance with one embodiment of the present invention.

As discussed above, the 2-dimensional DWT decomposition unit 14 outputs 10 2-dimensional frequency subband signals, $y_1(m,n)$–$y_{10}(m,n)$, in the preferred embodiment. These frequency subband signals are next processed in the TCQ encoder 16. Each of these frequency subband signals is comprised of one or more data blocks corresponding to blocks in the original image. For example, in a preferred embodiment, each block in a frequency subband signal corresponds to a 16×16 block in the original image. FIG. 4 is a block diagram illustrating the TCQ encoder 16 of FIG. 2 in one embodiment of the present invention. As illustrated, the TCQ encoder 16 includes: a mean subtraction unit 60, an energy calculation unit 62, a classification unit 64, a statistics calculation unit 66, a Q scalar quantization unit 68, a normalization unit 70, a TCQ trellis 72, and a rate allocation unit 74.

The mean subtraction unit 60 operates on the lowest frequency subband $y_1$. For the N samples in the lowest frequency subband (LFS), the mean is calculated as follows:

$$mean = \mu = \left[\sum_{n=1}^{N} b[n]\right]/N$$

where b[n] represents the samples in the LFS. The mean value is then subtracted from each sample in the LFS as follows:

$$b[n]=b[n]-\mu \text{ for all } n$$

The energy calculation unit 62 computes the variance of each block within each frequency subband as follows:

$$\sigma_i^2 = \frac{1}{L-1}\sum_{j=1}^{L}(x[j]-\mu)^2$$

where L is the number of elements in each block.

Figure 6:
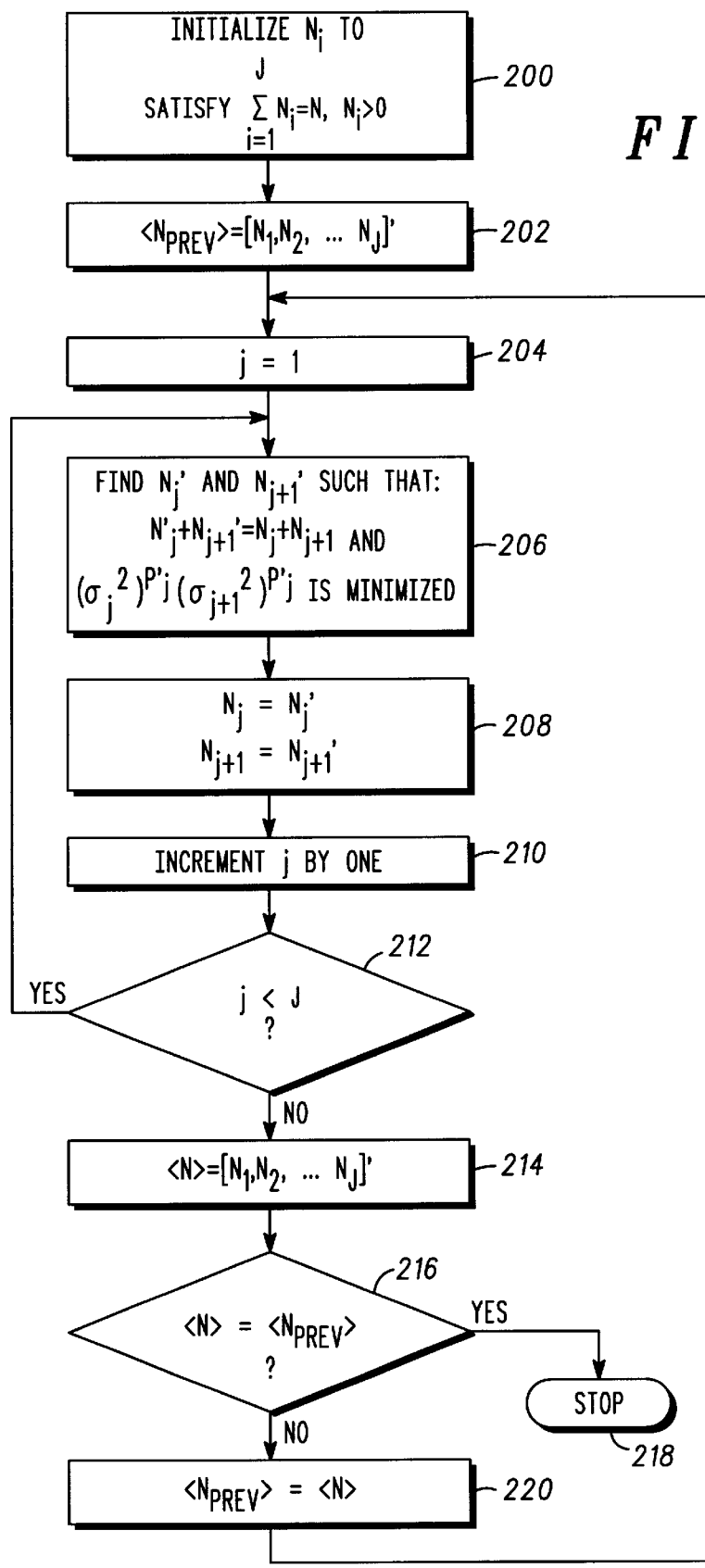
FIG. 6 is a flowchart illustrating a method for performing classification of signal blocks in accordance with one embodiment of the present invention.

The classification unit 64 is operative for classifying blocks within each of the frequency subbands into one of a plurality of classes. In the preferred embodiment, the classification method that is used is of the type described in "Optimum Classification in Subband Coding of Images", by Joshi et al, Proc. International Conference on Image Processing, November. 1994, which is hereby incorporated by reference. The method is a pairwise maximization of coding gain and is illustrated in the flowchart of FIG. 6. The flowchart assumes a source X of length NL divided into N blocks of L consecutive samples, with each block assigned to one of J classes. In the preferred embodiment, the source X represents a frequency subband signal output by the DWT decomposition unit 14. The samples from all blocks assigned to class i ($1 \leq i \leq J$) are grouped into a source $X_i$. The total number of blocks assigned to source $X_i$ is defined as $N_i$. Let $\sigma_i^2$ be the variance of $X_i$ and let $p_i$ be the probability that a sample belongs to $X_i$ (i.e., $p_i=N_i/N$).

With reference to FIG. 6, the method starts by initializing each $N_i$ (i.e., $N_1$, $N_2$, $N_3$, ..., $N_J$) to satisfy the following equation:

$$\sum_{i=1}^{J} N_i = N$$

where $N_i>0$ (step 200). The results of the initialization are then formed into a vector <N>$_{prev}$ as follows (step 202):

$$<N>_{prev}=[N_1, N_2, \ldots N_J]$$

Next, an index j is initialized to 1 (step 204). Values for $N_j'$ and $N_{j+1}'$ are now found such that $N_j'+N_{j+1}'=N_j+N_{j+1}$ and $(\sigma_j^2)^{p_j'}(\sigma_{j+1}^2)^{p_{j+1}'}$ is minimized (step 206). After values are found for $N_j'$ and $N_{j+1}'$, they are used to replace the original vales $N_j$ and $N_{j+1}$, respectively (step 208). Next, the index j is incremented by 1 (step 210) and is compared to the number of classes J (step 212). If j is less than J, the method returns to step 206 and values are found for $N_j'$ and $N_{j+1}'$ using the incremented index. If j is not less than J, then a new vector <N> is formed (step 214) as follows:

$$<N>=[N_1, N_2, \ldots, N_J]$$

The vector <N> is next compared to the vector <$N_{prev}$> (step 216) and, if they are the same, the classification method is stopped (step 218). If the vectors are not the same, the vector <$N_{prev}$> is made equal to the vector <N> (step 220) and the classification method returns to step 204 where the index j is reinitialized. The method is then repeated for all values of index j. After the classification method has ended, each of the blocks from the source $X_i$ have been appropriately classified.

The statistics calculation unit 66 computes the Kurtosis, variance, and standard deviation values of blocks within each subband assigned to the same class as follows:

$$Kurtosis = \sum_{i=1}^{N_j} (x[i])^4 / (\sigma_x^2)^2, \text{ for each class } j$$

where x[i] represents samples within the blocks classified in a particular class j for each frequency subband and $N_j$ is the number of samples from a particular subband assigned to class j, and $$variance = \sigma_x^2 = \frac{1}{N_j - 1} \sum_{i=1}^{N_j} (x[i] - \mu)^2,$$

where $\mu$ is the mean as described above, and $\sigma_x = \sqrt{\sigma_x^2}$ = standard deviation.

The above operations result in a number of Kurtosis, variance, and standard deviation values that is equal to the product of the number of frequency subbands and the number of classes (i.e., 10J in the preferred embodiment).

The Q scalar quantization unit 68 quantizes the standard deviations from the statistics calculation unit 66 and the mean of the LFS from the mean subtraction unit 60. In the preferred embodiment, a 16 bit uniform scalar quantizers are used and there are $2^{16}$ or 65,536 quantization levels. The normalization unit 70 receives each frequency subband signal and the quantized standard deviation values and divides each sequence by its respective standard deviation to obtain a sequence with unit variance and zero mean.

The rate allocation unit 74 receives the quantized Kurtosis values, the quantized standard deviation values, and rate distortion tables and calculates rate assignments for the corresponding sequences. In the preferred embodiment, rate allocation is performed by using the method described in "Efficient Bit Allocation for an Arbitrary Set of Quantizers" by Shoham et al., IEEE Trans. Acoust., Speech, and Signal Proc., vol. 36, September. 1988, which is hereby incorporated by reference. The overall mean square error (MSE) incurred by encoding the coefficient sequences using entropy constrained trellis coded quantization (ECTCQ) at an average rate of $R_s$ bits/coefficient is represented by:

$$E_s = \sum_{i=1}^{K} \alpha_i \sigma_i^2 E_{ij}(r_i)$$

where $\sigma_i^2$ is the variance of sequence i, $E_{ij}(r_i)$ denotes the rate-distortion performance of the j quantizer (e.g., the quantizer corresponding to the Kurtosis of sequence i) at $r_i$ bits/sample, K is the number of data sequences, and $\alpha_i$ is a weighting coefficient to account for the variability in sequence length. For a 10-band decomposition and J classes, K=10J.

The rate allocation vector $B=(r_1, r_2, \ldots, r_K)$ is chosen such that $E_s$ is minimized, subject to an average rate constraint:

$$\sum_{i=1}^{K} \alpha_i r_i \leq R_s \text{ bits/coefficient.}$$

It has been shown that the solution $B^*(r_1^*, r_2^*, \ldots, r_K^*)$ to the unconstrained problem:

$$\min_B \left\{ \sum_{i=1}^{K} (\alpha_i \sigma_i^2 E_{ij}(r_i) + \lambda \alpha_i r_i) \right\}$$

minimizes $E_s$ subject to $$\sum_{i=1}^{K} \alpha_i r_i \leq \sum_{i=1}^{K} \alpha_i r_i^*.$$

Thus, to find a solution to the constrained problem, it suffices to find $\lambda$ such that the solution to the above equation yields $$\sum_{i=1}^{K} \alpha_i r_i^* \leq R_s.$$

Procedures for finding the appropriate $\lambda$ are given in "Efficient Bit Allocation For An Arbitrary Set Of Quantizers" by Shoham et al., IEEE Trans. Acoust., Speech, and Signal Proc., vol. 36, September 1988, which is hereby incorporated by reference.

For a given $\lambda$, the solution to the unconstrained problem is obtained by minimizing each term of the above sum separately. If $S_j$ is the set of allowable rates for the $j^{th}$ quantizer and $r_i^*$ is the $i^{th}$ component of the solution vector $B^*$, then $r_i^*$ solves:

$$\min_{r_i \in S_j} \{\alpha_i \sigma_i^2 E_{ij}(r_i) + \lambda \alpha_i r_i\}.$$

Figure 5:
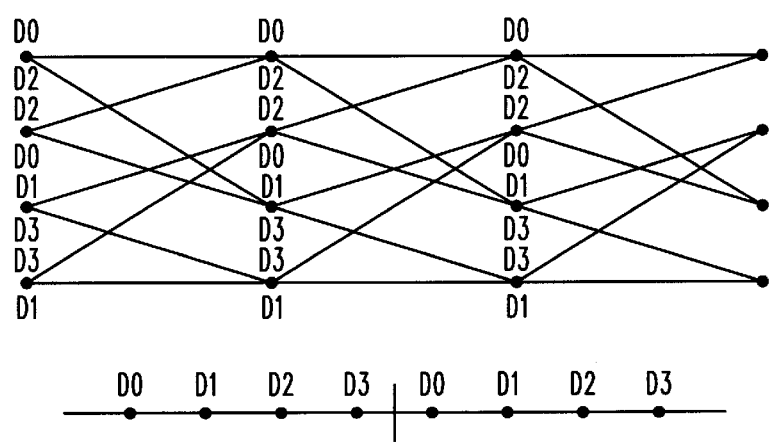
FIG. 5 is a diagram illustrating a trellis for performing trellis coded quantization.

The TCQ trellis 72 receives the normalized sequences derived from the subbands, the quantized Kurtosis values, and the rate assignments and uses them to generate quantization indices that represent the coded output signals of the TCQ encoder 16. FIG. 5 illustrates a typical TCQ trellis for performing this function. The particular trellis coded quantizer used (i.e., the specific rate and the appropriate generalized Gaussian optimized codebook) is determined by the rate allocation procedure and the Kurtosis of the sequence. Trellis coded quantization methods were developed in "Trellis Coded Quantization of Memoryless and Gauss-Markov Sources" by Marcellin et al, IEEE Trans. Commun., vol. COM-38, January. 1990, which is hereby incorporated by reference.

For encoding a memoryless source at R bits per sample, a codebook of size $2^{R+1}$ is partitioned into four subsets, each containing $2^{R-1}$ codewords. These subsets are labeled $D_0$, $D_1$, $D_2$, $D_3$, and are used as labels for the branches of a suitably chosen trellis. Sequences of codewords that can be produced by the TCQ system are those that result from "walks" along the trellis from left to right. For example, if beginning in the top left state of the trellis in FIG. 5, the first codeword must be chosen from either $D_0$ or $D_2$. If a codeword from $D_2$ is chosen, then we walk along the lower branch (shown with a heavy line) to the second state from the bottom, at which we must choose a codeword from either $D_1$ or $D_3$. Note that at each step in the encoding, the codeword must be chosen from either $A_0 = D_0 \cup D_2$ or $A_1 = D_1 \cup D_3$. Each of these "supersets" contains $2^R$ codewords and hence, given an initial trellis state, the sequence of selected codewords can be transmitted using one R-bit label for each sample.

Given an input data sequence $x_1, x_2, \ldots$, the best (i.e., minimum mean-squared-error) allowable sequence of codewords is determined as follows. For the $i^{th}$ stage in the trellis (corresponding to $x_1$), the best codeword is the $j^{th}$ subset (j=0,1,2,3), say $c_j$, is chosen and the associated cost $p_j=(x_i-c_j)^2$ is calculated. Each branch is the $i^{th}$ stage of the trellis that is labeled with subset $D_j$ is assigned cost $\eta_j$. The Viterbi algorithm is then used to find the path through the trellis with the lowest overall cost.

In the paper "On Entropy-Constrained Trellis Coded Quantization" by Marcellin, *IEEE Trans. Commun.*, vol. 42, pp. 14–16, January 1994 ("Marcellin"), the codeword labels (as described above) were noiselessly compressed using one variable length code for each superset. The encoding rate achievable by this process is the conditional entropy of the codebook C, given the subset:

$$H(C|A) = -\sum_{i=0}^{1} \sum_{c \in A_i} P(c|A_i) P(A_i) \log_2 P(c|A_i)$$

For a codebook of size $2^{R+1}$, this noiseless compression causes the encoding rate to fall below R bits/sample. Thus, the size of the codebook should be increased. Procedures for designing optimum codebooks for a given encoding rate are discussed in Marcellin and the paper "Entropy Constrained Trellis Coded Quantization" by Fischer et al., *IEEE Trans. Inform. Th.*, vol. 38, pp. 415–425, March 1992 (Fischer et al.).

For encoding the memoryless Gaussian source, Marcellin and Fischer et al. show that an 8-state entropy constrained system comes within 0.5 dB of the rate-distortion function for all non-negative rates. Further, our experimentation has shown that similar performance is achievable with various generalized Gaussian distributions.

As discussed above, the DPCM loop 26 requires the coded output signal from the TCQ encoder 16 to be dequantized and reconstructed. This is performed in the TCQ decoder 18 and the two-dimensional DWT reconstruction unit 20, respectively. The TCQ decoder 18 performs the inverse operation of the TCQ encoder 16, resulting in a plurality of frequency subband signals $Y_1'-Y_{10}'$. The frequency subband signals are input to the DWT reconstruction unit 20 where they are reassembled. FIG. 7 is a block diagram illustrating a DWT reconstruction unit 20 in one embodiment of the present invention. The unit 20 includes a plurality of low pass filters 80–88, a plurality of high pass filters 90–98, a plurality of 1-to-2 up sampler units 100, and a plurality of summers 102. Operation of the DWT reconstruction unit 20 is essentially the reverse of the operation of the DWT decomposition unit 14 described above. The impulse responses (i.e., $h_1-h_9$ and $g_1-g_9$) of the low-pass filters 80–88 and the high-pass filters 90–98 are related to the impulse responses for the corresponding filters in the DWT decomposition unit 14 (i.e., $h_1'-h_9'$ and $g_1'-g_9'$) as described above. The 1-to-2 up samplers add a bit of information (e.g., a zero) between each successive pair of data bits in an input data stream. The summers 102 are operative for adding the spectral subband components to one another to ultimately achieve a single signal.

The DWT reconstruction unit 20 outputs error image estimate $\epsilon_n'$. The adder 22 receives the error image estimate $\epsilon_n'$ and the predicted image $x^*_{n|n-1}$ from the interband predictor 24 and adds the two signals to derive an estimate of the present input image $x_n'$. The interband predictor 24 receives the image estimate $x_n'$ and uses the estimate to predict the next image at the input of the hyperspectral image encoder 10. It can be shown that for a nonzero mean input sequence, the optimum (i.e., minimum mean square error (MSE)) first order linear predictor is given by the following equation:

$$x^*_{i|i-1} = \rho x_{i-1} + \mu(1-\rho)$$

where $x^*_{i|i-1}$ is the predicted value of $x_i$, $\mu$ is the mean and $\rho$ is the correlation coefficient of the sequence. In a preferred embodiment of the invention, a spectral correlation coefficient of 0.95 is used in the DPCM loop 26.

What is claimed is:

1. An apparatus for use in compressing hyperspectral imagery, said hyperspectral imagery including a sequence of images, said apparatus comprising:
    a differential pulse code modulation (DPCM) loop for processing at least two images to create an error image;
    a discrete wavelet transform (DWT) decomposition unit for decomposing said error image into a plurality of frequency subbands; and
    a trellis coded quantization (TCQ) encoder for quantizing information within said plurality of frequency subbands according to a plurality of discrete quantization levels to create a coded output signal; wherein
        said TCQ encoder includes a classification unit for classifying at least one block within each of said plurality of frequency subbands into one of a plurality of classes;
        said plurality of frequency subbands includes a first frequency subband that includes a plurality of blocks;
        said classification unit includes means for determining a first number of blocks in said first frequency subband that fall within a first class in said plurality of classes and a second number of blocks in said first frequency subband that fall within a second class in said plurality of classes;
        said classification unit includes means for adjusting said first number of blocks and said second number of blocks;
        said means for adjusting includes means for adjusting using a statistical criterion; and
        said statistical criterion includes a combination of a variance value for blocks that fall within said first class and a variance value for blocks that fall within said second class.

2. An apparatus for use in compressing hyperspectral imagery, said hyperspectral imagery including a sequence of images, said apparatus comprising:
    a differential pulse code modulation (DPCM) loop for processing at least two images to create an error image;
    a discrete wavelet transform (DWT) decomposition unit for decomposing said error image into a plurality of frequency subbands; and
    a trellis coded quantization (TCQ) encoder for quantizing information within said plurality of frequency subbands according to a plurality of discrete quantization levels to create a coded output signal; wherein
        said TCQ encoder includes a classification unit for classifying at least one block within each of said plurality of frequency subbands into one of a plurality of classes;
        said plurality of frequency subbands includes a first frequency subband that includes a plurality of blocks;
        said classification unit includes means for determining a first number of blocks in said first frequency subband that fall within a first class in said plurality of classes and a second number of blocks in said first frequency subband that fall within a second class in said plurality of classes;

said classification unit includes means for adjusting said first number of blocks and said second number of blocks;

said means for adjusting includes means for adjusting using a statistical criterion; and said statistical criterion includes $(\sigma_1^2)^{p_1}(\sigma_2^2)^{p_1}$, where $\sigma_1^2$ is a variance for blocks in said first class, $\sigma_2^2$ is the variance for blocks in said second class, and $p_1$ is a probability that a block in said first frequency subband belongs to said first class.

* * * * *

UNITED STATES PATENT AND TRADEMARK OFFICE
CERTIFICATE OF CORRECTION

PATENT NO.     : 6,539,122 B1
DATED          : March 25, 2003
INVENTOR(S)    : Glen Patrick Abousleman It is certified that error appears in the above-identified patent and that said Letters Patent is hereby corrected as shown below:

Column 5,
Line 23, delete "where H((w)" and insert -- where H(w) --

Column 7,
Line 52, delete "of the j quantizer" and insert -- of the $j^{th}$ quantizer --

Column 9,
Line 5, delete "cost $\eta_j$." and insert -- cost $\rho_j$. --

Signed and Sealed this

Thirteenth Day of May, 2003

JAMES E. ROGAN
*Director of the United States Patent and Trademark Office*